June 23, 1970 C. M. LAY 3,517,322
PHASE DETECTOR
Filed Jan. 22, 1968

INVENTOR.
Clark M. Lay
BY
Roland A. Anderson
ATTORNEY.

United States Patent Office 3,517,322
Patented June 23, 1970

1

3,517,322
PHASE DETECTOR
Clark M. Lay, Oak Ridge, Tenn., assignor to the United States of America as represented by the United States Atomic Energy Commission
Filed Jan. 22, 1968, Ser. No. 699,575
Int. Cl. H03b 3/04
U.S. Cl. 328—133                                    4 Claims

ABSTRACT OF THE DISCLOSURE

A phase detector for handling count pulses in a bidirectional counting system has been provided. Phase differing input pulses indicative of a given count and the direction of that count are converted to a single count pulse of a predetermined duration and presented at either a "forward" or "backward" count output terminal depending upon the phase relationship of the input pulses, thus eliminating the need for the usual direction command signal in processing bidirectional count pulses.

Background of the invention

This invention was made in the course of, or under, a contract with the U.S. Atomic Energy Commission.

In certain positioning systems, the position of a movable component, for example, a machine slide, is measured by means of an interferometer. The interferometer develops two fringe patterns which are 90° out of phase. By means of light-responsive circuitry, the patterns are converted to two sinusoidal voltages having a phase displacement of 90°. One cycle of each of the voltages is generated each time that the machine slide moves through a "fringe distance," e.g., 12.457 microinches. Forward movement of the slide causes a certain one of the voltages to lead; backward movement causes the other voltage to lead.

In the conventional bidirectional pulse handling system, pulses indicative of an increment of movement are not separated or presented at separate outputs, but are synchronized with direction command pulses for subsequent counting. In other words, when the pulse shaping circuit receives an input pulse it must generate a pulse and also generate and synchronize therewith a direction command signal, or synchronize the generated pulse with an externally generated command signal, for subsequent counting or actuation of a bidirectional utilization device, such as a digital control system. The direction command signals must be precisely synchronized with the count pulse or accurate counting will not be achieved. Thus, the typical system must include means for synchronizing the direction command signals with the count pulses.

When using the above described conventional bidirectional count pulse handling system in interferometer fringe increment counting, the count rate can be very rapid due to the fringe increment count being in the range of only 12 microinches. Counts are frequently lost when the feedback interferometer is subject to rapid vibration common to many environments. It has been noted that counts are lost because synchronism is not maintained between the count pulse and the direction command signal. The primary cause of error is the switching time required by the synchronizing circuitry. This limitation is especially pronounced where a laser interferometer is the distance-measuring element, because the slightest vibration is likely to cause the interferometer to generate a train of "forward" and "backward" pulses occurring at a very rapid rate. It was found that when rapid reversals of a machine slide movement occurred, counts were lost even at comparatively low rates of slide travel, e.g., 6–10 inches per minute.

Summary of the invention

This invention is a system for overcoming the above-mentioned limitation in conventional bidirectional pulse handling systems and has as its primary object to provide a bidirectional pulse handling circuit which provides count increment pulses at separate outputs depending upon their count direction and thus eliminates the need for a synchronizing circuit.

Further, it is an object of the present invention to provide a phase detector which functions more accurately at higher detecting rates.

Still another object of the present invention is to provide a phase detector which generates a single pulse output at one of two output terminals determined by a leading one of a pair of phase displaced input signals.

Briefly, the present invention calls for a first squaring circuit connected for receiving a first signal indicative of a count increment, and a second squaring circuit connected for receiving a second signal phase displaced from said first signal, either leading or lagging depending upon the direction of counting. The first squaring circuit provides a first square wave output which is in phase with the first input signal and a second square wave output which is 180° out of phase with the first input signal. The second squaring circuit provides a square wave output which is in phase with the second input signal applied to the second squaring circuit. A coincidence circuit is provided to receive the square wave outputs of the two squaring circuits and produces either an output pulse at either the "forward" or "backward" output, depending upon the phase relationship of the square waves applied thereto.

Other objects and many of the attendant advantages of the present invention will be readily evident from the following description when taken in conjunction with the accompanying drawings.

Description of the preferred embodiment

Figure 1:
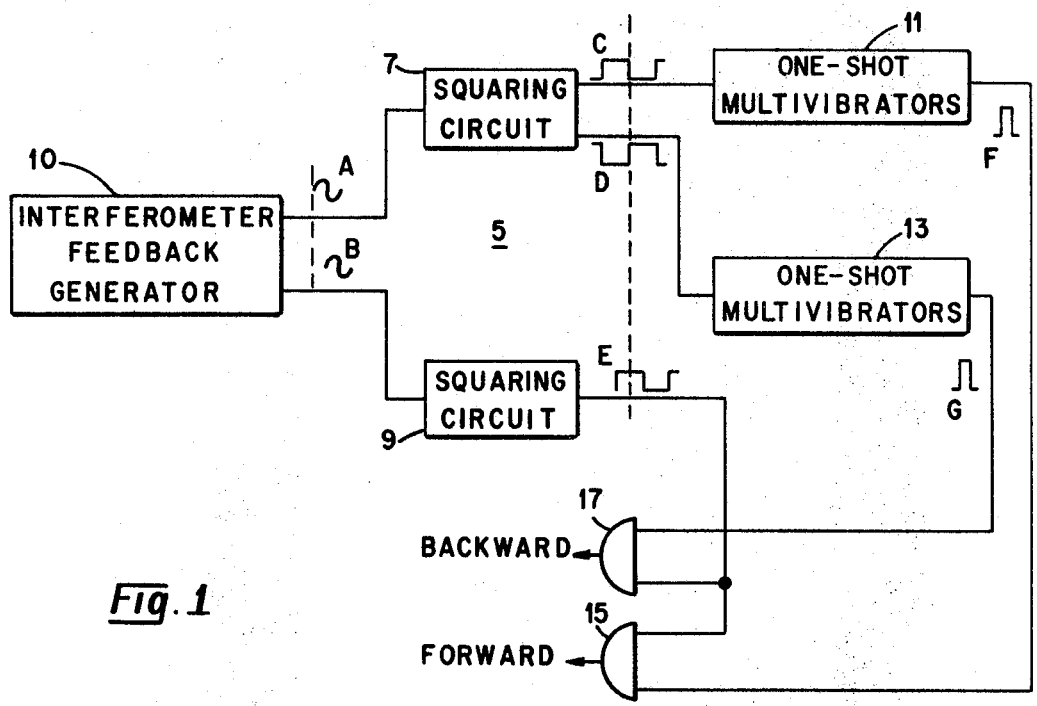
FIG. 1 is a schematic diagram of a phase detector according to the present invention.

Referring to FIG. 1, the phase detector 5 includes two square wave generators denoted as "squaring circuits" 7 and 9 which are connected to receive phase displaced signals such as the output of an interferometer feedback generator 10 having output voltages A and B. Squaring circuits 7 and 9 may be standard bistable multivibrators such as the well known Schmitt trigger circuit. The squaring circuit 7 is adapted to provide two separate outputs— a square wave C which is in phase with signal A, and a square wave D which is 180° out of phase with signal A. The Schmitt trigger circuit can be readily adapted to provide identical outputs which are shifted 180° in phase because of its inherent operation; that is, it operates as a two stage amplifier wherein the stages are 180° out of phase with each other. Thus, it can be seen that the output of each stage can be used to provide the necessary outputs C and D.

Outputs C and D, together with output E of squaring circuit 9, are connected to coincidence circuitry which provides a single output pulse at one of a pair of output terminals, depending upon the phase relationship of the square waves C, D, and E.

As shown, the preferred coincidence circuit consists of one-shot multivibrators 11 and 13 whose inputs are connected to outputs C and D, respectively. The outputs of multivibrators 11 and 13 are connected to inputs of "NAND" gates 15 and 17, respectively, while the output E of squaring circuit 9 is connected commonly to separate inputs of gates 15 and 17.

To facilitate the explanation of the operation of the present phase detector, the output of gate 15 is designated a "forward" output. When an output pulse is obtained there, signal A is leading signal B. The output of gate 17 is designated "backward." When an output pulse is obtained there, signal B is leading signal A. On receiving a cycle of the A signal, the squaring circuit 7 generates two separate outputs—a square wave C which is in phase with signal A, and a square wave D which is 180° out of phase therewith, as explained above. These square waves, which in this embodiment vary between the levels of 0 to −6 volts, are impressed on the one-shot multivibrators 11 and 13, respectively. The multivibrators respond to their input signal by generating very narrow positive-going pulses F and G, respectively. The pulse F generated by the input square wave C is transmitted to NAND gate 15. The other positive-going pulse G is transmitted to NAND gate 17.

When the squaring circuit 9 receives a cycle of the B signal, it generates a square wave E, as described above, in phase with B. This square wave E is impressed on both of the gates 15 and 17. As will be explained in more detail, if the inputs to either gate are in positive coincidence, that gate will generate a negative-going pulse.

Figure 2:
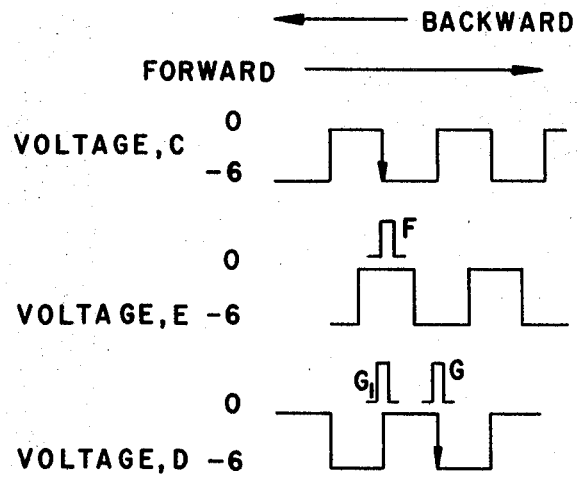
FIG. 2 is a graphic illustration of the phase relationship of certain control voltages in a phase detector as shown in FIG. 1.

FIG. 2 illustrates the phase relationship of the above-mentioned square waves (C, D, and E) and positive-going pulses (F and G) from the multivibrators 7 and 9, respectively. Assuming voltage signal A is leading, it will be noted that there is positive coincidence between the E square wave and the pulse F generated by the negative-going excursion (0 to −6 volts) of square wave C. In other words, the inputs to gate 15 are at their most positive level (zero) at the same time. Thus, gate 15 being a NAND gate transmits one pulse to the "forward" output. As shown, in the forward sense, that is, voltage A leading, square wave D generates a narrow, positive-going pulse G, but this pulse is not in positive coincidence with E, since pulse G is generated only on the negative-going excursion (0 to −6 volts) of wave D.

The circuit operates in an analogous manner in the backward sense, that is, voltage B leading. This can readily be seen by reading the graph of FIG. 2 from right to left since signal B is now leading signal A by nominally 90°. Positive coincidence occurs between the square wave E and the pulse $G_1$. Consequently, gate 17 transmits one pulse to the backward output, thus indicating that input signal B is leading.

Thus, when the present detector is used with an interferometer feedback generator 10, for example, to position a machine slide, slide movement in a given direction, as indicated by the phase relationship of the nominally 90° phase, displaced input signals A and B, will cause the detector 5 to generate an output pulse at either the "forward" or "backward" output depending upon the direction of slide movement. This pulse indicates not only the direction of slide movement but represents one increment of slide movement as measured by the fringe increment of the interferometer and can be applied directly to a bidirectional count or feedback control unit to provide faster and more accurate response due to the elimination of a "forward" or "backward" direction command signal which must be synchronized with the increment count pulse.

Preferably, the peaks of the narrow pulses F and G are of very short duration (e.g., 1.5 to 4 microseconds or less) compared with the positive alternation of the square wave E, which has approximately a 15-microsecond duration. This ensures that for a given cycle of phase displaced input signals there will be positive coincidence between the E square wave and the appropriate pulse, either F or G even if there is an appreciable shift in the position of either pulse F or G. Thus, the detector will detect the leading one of the input signals over a wide range of phase displacement other than the nominal 90° as in an interferometer feedback generator.

Thus, it will be seen that a phase detector has been provided which will function more accurately at higher detecting rates to provide an output pulse at either a "forward" or "backward" output responsive to the leading one of a pair of input signals.

In view of the above and numerous other equally possible arrangements, the scope of the present invention should be considered limited only by the following claims attached to and forming a part of this specification.

What is claimed is:

1. Means for detecting and presenting a binary pulse at one of a pair of outputs responsive to a leading one of a pair of phase displaced input signals presented at separate inputs, comprising: a first squaring circuit connected for receiving one of said input signals, said first squaring circuit having a first and second square wave output responsive to said input signal applied thereto, said first square wave output being in phase with said input signal applied thereto and said second wave output being 180° out of phase with said first square wave output; a second squaring circuit connected for receiving the other of said phase displaced input signals, said second squaring circuit generating a third square wave output having positive and negative levels responsive to and in phase with said input signal applied thereto; and coincidence circuit means connected to receive said first, second, and third square wave outputs and to produce first and second binary outputs, a coincidence of the negative-going excursion of said first square wave output with the positive level of said third square wave output produces a pulse which is obtained at said first binary output, and coincidence of the negative-going excursion of said second square wave output with the positive level of said third square wave output produces a pulse at said secondary binary output.

2. A phase detector as set forth in claim 1 wherein said coincidence circuit means includes a first multivibrator having an input connected to said first square wave output for producing output pulses for each square wave input, a second multivibrator having an input connected to said second square wave output for producing an output pulse for each square wave input; a first NAND gate having first and second inputs and an output; and a second NAND gate having first and second inputs and an output, said first input of said first NAND gate being connected to the output of said first multivibrator, said first input of said second NAND gate being connected to the output of said second multivibrator, said second inputs of said first and second NAND gates being connected to said third square wave output.

3. A phase detector as set forth in claim 2 wherein said first and second multivibrators are one-shot multivibrators which produce at their output pulses of predetermined time duration for each square wave input.

4. A phase detector as set forth in claim 1 wherein said first and second squaring circuits are bistable multivibrators.

References Cited

UNITED STATES PATENTS 3,028,589   4/1962   Broadwell.
3,219,938   11/1965  Greening _____ 328—133
3,441,745   4/1969   Reeves et al. _____ 340—170 XR

FOREIGN PATENTS 676,836   8/1952   Great Britain.
1,014,099  12/1965  Great Britain.

STANLEY T. KRAWCZEWICZ, Primary Examiner

U.S. Cl. X.R.

328—155; 307—232, 295; 340—170